(12) United States Patent
Workman

(10) Patent No.: US 10,239,153 B2
(45) Date of Patent: Mar. 26, 2019

(54) INERTIA FRICTION WELDING SYSTEM FOR MARTENSITE-FREE JOINING OF MATERIALS

(71) Applicant: EDISON WELDING INSTITUTE, INC., Columbus, OH (US)

(72) Inventor: David P. Workman, Dublin, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 41 days.

(21) Appl. No.: 15/333,880

(22) Filed: Oct. 25, 2016

(65) Prior Publication Data

US 2017/0326680 A1 Nov. 16, 2017

Related U.S. Application Data

(63) Continuation-in-part of application No. 14/564,598, filed on Dec. 9, 2014, now Pat. No. 9,498,843, which
(Continued)

(51) Int. Cl.
*B23K 20/227* (2006.01)
*B23K 20/12* (2006.01)
(Continued)

(52) U.S. Cl.
CPC ........ *B23K 20/227* (2013.01); *B23K 20/1205* (2013.01); *B23K 20/129* (2013.01);
(Continued)

(58) Field of Classification Search
None
See application file for complete search history.

(56) References Cited

U.S. PATENT DOCUMENTS 2,276,823 A 3/1942 Cadwell
2,401,048 A 5/1946 Cadwell
(Continued)

FOREIGN PATENT DOCUMENTS

CN 201618914 U 11/2010
CN 102534403 A 7/2012
(Continued)

OTHER PUBLICATIONS

International Search Report and Written Opinion of the International Searching Authority received in PCT/US2016/58673, dated Jan. 17, 2017.

*Primary Examiner* — Devang R Patel
(74) *Attorney, Agent, or Firm* — Frost Brown Todd LLC

(57) ABSTRACT

A method for joining materials such as metal alloys that includes a first component, wherein the first component includes a first alloy having a known austenization temperature below which martensite forms when the component is heated and then cooled at a predetermined rate of cooling; a second component, wherein the second component includes a second alloy; and a welding apparatus operative to create a weld between the first and second components without crossing the austenization temperature of the first alloy. The method also includes the steps of validating the characteristics of the weld created between the first and second components in real-time during the welding process; modifying the welding apparatus to prepare the surface of the first component prior to welding to assure proper alignment of the first and second components; and/or physically modifying the second component to enhance the welding characteristics and durability thereof.

6 Claims, 5 Drawing Sheets

Related U.S. Application Data is a continuation of application No. 13/733,273, filed on Jan. 3, 2013.

(60) Provisional application No. 61/697,675, filed on Sep. 6, 2012.

(51) Int. Cl.
 B23K 20/233 (2006.01)
 B23K 101/26 (2006.01)
 B23K 103/04 (2006.01)
 B23K 103/12 (2006.01)

(52) U.S. Cl.
 CPC ........ B23K 20/233 (2013.01); B23K 2101/26 (2018.08); B23K 2103/04 (2018.08); B23K 2103/12 (2018.08)

(56) References Cited

U.S. PATENT DOCUMENTS

| | | | |
|---|---|---|---|
| 3,180,970 A | 4/1965 | Gilson et al. | |
| 3,597,832 A | 8/1971 | Calton et al. | |
| 3,891,332 A | 6/1975 | Molyneux et al. | |
| 4,067,490 A | 1/1978 | Jones et al. | |
| 4,179,067 A | 12/1979 | Baier | |
| 4,757,932 A | 7/1988 | Benn et al. | |
| 5,161,891 A | 11/1992 | Austill | |
| 5,449,116 A | 9/1995 | Bruning | |
| 6,779,709 B2 | 8/2004 | Stotler et al. | |
| 6,857,553 B1 | 2/2005 | Hartman et al. | |
| 8,123,104 B1 | 2/2012 | Potter et al. | |
| 2002/0190097 A1 | 12/2002 | Pettersen | |
| 2003/0209591 A1 | 11/2003 | Wada | |
| 2004/0060966 A1 | 4/2004 | Stotler et al. | |
| 2007/0194143 A1 | 8/2007 | Palermo | |
| 2008/0214042 A1 | 9/2008 | Judson et al. | |
| 2010/0178526 A1 | 7/2010 | Fujii et al. | |
| 2011/0309131 A1 | 12/2011 | Hovanski et al. | |
| 2012/0012644 A1* | 1/2012 | Baxter | B23K 20/121 228/104 |
| 2013/0068825 A1* | 3/2013 | Rosal | B23K 20/1215 228/114 |
| 2014/0061282 A1 | 3/2014 | Workman | |
| 2015/0090772 A1 | 4/2015 | Workman | |

FOREIGN PATENT DOCUMENTS

| | | |
|---|---|---|
| JP | 2001025885 A | 1/2001 |
| JP | 2006063637 A | 3/2006 |

* cited by examiner

US 10,239,153 B2

INERTIA FRICTION WELDING SYSTEM FOR MARTENSITE-FREE JOINING OF MATERIALS

CROSS-REFERENCE TO RELATED APPLICATIONS

This patent application is a continuation-in-part of U.S. patent application Ser. No. 14/564,598 filed on Dec. 9, 2014 and entitled "System for Preventing the Formation of Martensite in Metals Joining Applications", which was a continuation of U.S. patent application Ser. No. 13/733,273 filed on Jan. 3, 2013 and entitled "System for Preventing the Formation of Martensite in Metals Joining Applications", which claimed the benefit of U.S. Provisional Patent Application Ser. No. 61/697,675 filed on Sep. 6, 2012 and entitled "System and Method for Joining Materials," the disclosures of which are incorporated by reference for all purposes, as if fully rewritten herein.

STATEMENT REGARDING FEDERALLY FUNDED RESEARCH

This invention was supported in part by contract number DTFR53-12-C-00002 from the Federal Railroad Administration, Track Research Division. The U.S. Government has certain rights in the invention.

BACKGROUND OF THE INVENTION

The present invention relates generally to a system and method for joining two components to one another, particularly where one of the two components is a hardened metal, and more specifically to a system and method for attaching a stud or other appurtenance to a specific location on a length of steel rail for the purpose of attaching a signal wire to the stud.

Railroad signaling systems are essential for enabling safe and efficient movement of rail traffic. Many modern railroad signal systems employ a track circuit to detect the presence of a train within a section of track known as a signal block. The basic principle behind the track circuit involves the connection of the two rails by the wheels and axle of locomotives to short out an electrical circuit. This circuit is monitored by electrical equipment to detect the absence of the trains. An integral part of the track circuit is the two parallel running rails on which a train runs. Various types of signal devices are typically connected to these rails to complete the track circuit. Known techniques for connecting a wire to a rail include exothermic welding processes where the wire is welded to the rail. Other techniques include compressing a metal sleeve including the wire in a hole drilled in the rail or clamping a wire directly to the rail. Many signaling system incidents are known to be caused by failures at the rail-wire interface, where track wires, bond wires, or propulsion-current bond wires are attached to the rails to provide an electrical path for controlling train control signals. These failures contribute to train delays and additional maintenance costs for emergency and unplanned repairs and are highly undesirable for these and other reasons.

As indicated above, signal wires are attached to rails to allow for positive train control and to sense breaks in the rails for avoiding accidents. A reliable signal wire-to-rail connection is essential for signal system functionality and failures cause service disruptions and can affect the integrity of the rail, leading to rail failure. Currently used methods for attaching a signal wire to a length of track involve the use of an appurtenance or stud that is attached directly to the rail. The signal wire is then attached or connected to the stud. Common attachment methodologies include brazing, soldering, drilling, and/or clamping the stud/wire to the rail. Many brazing methods require preheating the rail section to which the stud will be attached and then precisely controlling the rate of cooling to avoid the undesirable formation of untempered martensite in the rail. With brazing methodologies there is also the risk of liquid metal embrittlement as the rail is under tensile stress to maintain neutral temperature and a liquid metal is present during the process. Accordingly, it is a common precautionary practice to locate the studs at the neutral axis of the rail due to the possible formation of a brittle layer around the joint caused by overheating of the stud/wire to rail connection point. The placement of welds/braze joints on the head of the rail is known to have resulted in the formation of martensite in the head of the rail, which initiated cracks that led to several train derailments; thus the neutral axis is generally safer from a catastrophic failure perspective. However, placement at this location makes the wire harnesses susceptible to snagging by maintenance equipment and the formation of martensite in this area may still lead to cracking and rail failure. Furthermore, most known attachment methodologies require a degree of operator skill, the absence of which may result in inconsistent or incorrect installations and ultimately in failure of the stud/wire connection, particularly in mass production. Thus, there is an ongoing need for an improved system and method for attaching a stud or appurtenance to a specific location on a length of steel rail.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first system and method for joining materials is provided. This system includes a first component, wherein the first component includes a first alloy having a known austenization temperature below which martensite forms when the component is heated and then cooled at a predetermined rate of cooling; a second component, wherein the second component includes a second alloy; and a welding apparatus operative to create a weld between the first and second components without crossing the austenization temperature of the first alloy. This method also includes the steps of providing devices for validating the characteristics of the weld created between the first and second components in real-time during the welding process; modifying the welding apparatus to prepare the surface of the first component prior to welding to assure proper alignment of the first and second components; and/or physically modifying the second component to enhance the welding characteristics and durability thereof.

In accordance with another aspect of the present invention, a second system and method for joining materials is provided. This system includes a first component, wherein the first component includes a first alloy having a known austenization temperature below which martensite forms when the component is heated and then cooled at a predetermined rate of cooling; a second component, wherein the second component includes at least one low-sulfur, low-lead alloy; and a welding apparatus operative to create a weld between the first and second components without crossing the austenization temperature of the first alloy, wherein the welding apparatus is an inertia friction welding machine. This method also includes the steps of providing devices for validating the characteristics of the weld created between the first and second components in real-time during the welding process; modifying the welding apparatus to prepare the surface of the first component prior to welding to assure proper alignment of the first and second components; and/or physically modifying the second component to enhance the welding characteristics and durability thereof.

In yet another aspect of this invention, a third system and method for joining materials is provided. This system includes a first component, wherein the first component includes a first alloy having a known austenization temperature below which martensite forms when the component is heated and then cooled at a predetermined rate of cooling, wherein the first component further includes heat-treated steel, and wherein the first component is a length of train rail; a second component, wherein the second component includes at least one low-sulfur, low-lead alloy, wherein the second component further includes an appurtenance that is operative to provide a surface to which a signal wire or other device may be attached, and wherein the appurtenance is a stud, bolt, or block; and a welding apparatus operative to create a weld between the first and second components without crossing the austenization temperature of the first alloy, wherein the welding apparatus is operative to perform solid-state welding, and wherein the welding apparatus is an inertia friction welding machine. This method also includes the steps of providing devices for validating the characteristics of the weld created between the first and second components in real-time during the welding process; modifying the welding apparatus to prepare the surface of the first component prior to welding to assure proper alignment of the first and second components; and/or physically modifying the second component to enhance the welding characteristics and durability thereof.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE FIGURES

The accompanying images, which are incorporated into and form a part of the specification, illustrate one or more exemplary embodiments of the invention and serve to explain the principles of the invention, and wherein.

DESCRIPTION OF THE INVENTION

Figure 1:
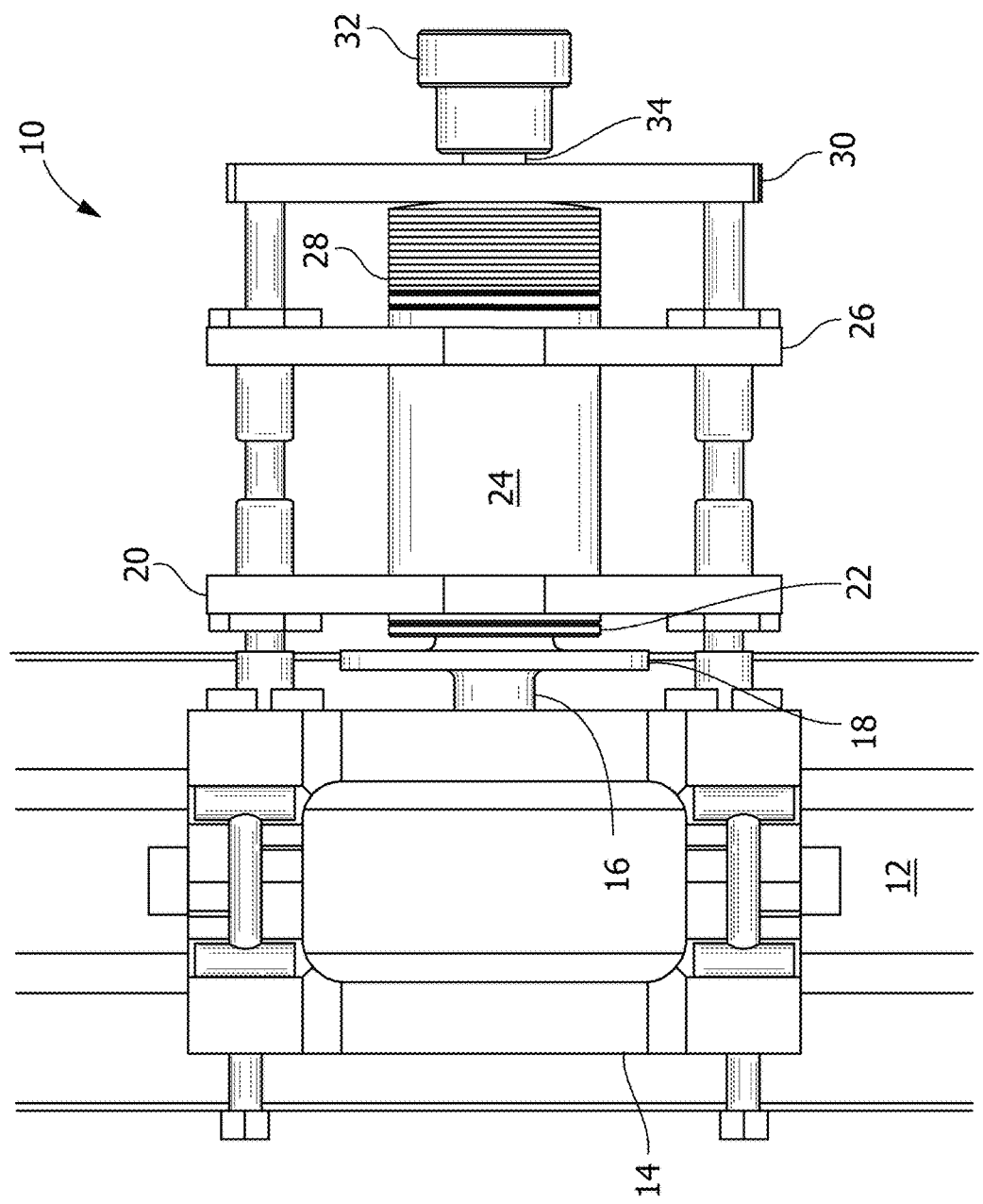
FIG. 1 is a side view of a portable inertia friction welder mounted on a length of rail in accordance with an exemplary embodiment of this invention.

Certain exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously stated, the present invention relates generally to a system and method for joining two components to one another, particularly where one of the two components is a hardened metal, and more specifically to a system and method for attaching a stud or appurtenance to a specific location on a length of steel rail for the purpose of attaching a signal wire to the stud. The system and method of this invention have applicability beyond use with rails and signal wires because the process can also be used to attach appurtenances to hardenable materials without negatively affecting the underlying material properties. For example, attaching a bolt on location to a hardened cutting surface that is heat treated would be possible without deleterious effects to the pre-hardened material. Essentially, the system and method of this invention may be used for any number of applications that require the attachment of one metal component to another metal component wherein the use of more traditional joining or welding techniques would potentially damage the substrate metal. Using the system and method of this invention, the risk of liquid metal embrittlement and martensite formation are substantially eliminated because there is no melting of a stud or braze material to infiltrated the grain boundaries in the steel and the welding temperature is kept below the critical transformation temperature of hardened steel. Various exemplary embodiments of this invention are described in greater detail below.

The present invention typically includes two or more metal components that are joined together using a welding technique that avoids damaging either component during the joining process. In one exemplary embodiment, the first component is a length of hardened steel rail used for train track. Modern track typically uses hot rolled steel with a profile of an asymmetrical rounded I-beam. Unlike some other uses of iron and steel, railway rails are subject to very high stresses and are typically made of very high-quality steel alloy. Attachment of an appurtenance to heat-treated steel is typically very difficult due the nature of this alloy. The second component is a lower-strength appurtenance such as a stud to which signal wire is or will be attached. This stud is joined to the steel rail at a desired location using a welding process, such as friction welding, which prevents the occurrence of liquid metal embrittlement in the rail alloy. Friction welding is a solid-state welding process that generates heat through mechanical friction between a moving workpiece and a stationary component, with the addition of a lateral force called "upset" to plastically displace and fuse the materials. The combination of fast joining times (on the order of a few seconds), and direct heat input at the weld interface, yields relatively small heat-affected zones. Friction welding techniques are generally melt-free, which avoids grain growth in engineered materials, such as high-strength, heat-treated steels. Another advantage of friction welding is that it allows dissimilar materials to be joined to one another. Normally, the wide difference in melting points of two dissimilar materials would make it nearly impossible to weld using traditional techniques, and would require some sort of mechanical connection. Friction welding provides a "full strength" bond with no additional weight.

With regard to a steel rail component, the system and method of the present invention produces a weld on rail steel without crossing the known austenitization temperature for such steel, thereby avoiding the need for tempering post weld or controlled cooling to avoid martensite formation. Austenitization involves heating iron, an iron-based metal, or steel to a temperature at which it changes crystal structure from ferrite to austenite. Martensite refers to a very hard form of steel crystalline structure and is formed by rapid cooling (quenching) of austenite which traps carbon atoms that do not have time to diffuse out of the crystal structure. This martensitic reaction begins during cooling when the austenite reaches a known martensite start temperature and the parent austenite becomes mechanically unstable. Since quenching can be difficult to control, many steels are quenched to produce an overabundance of martensite and then tempered to gradually reduce its concentration until the right structure for the intended application is achieved. Too much martensite leaves steel brittle, too little leaves it soft. With regard to an appurtenance or stud component, certain materials (e.g., low-sulfur, low-lead alloys) exhibit highly desirable characteristics, which permit friction welding of the stud to the rail without a temperature in excess of the austenitization temperature of the rail or steel without demanding thrust loads that are too high for a portable inertia welding system. The use of a hexagonal shaped stud with a circular face minimizes machining cost for the stud and provides wrench flats during in-service work.

One embodiment of this invention utilizes a portable battery-powered inertia friction welder that is mounted on a length of rail for low-energy input welding. The use of a low mass flywheel coupled with high surface velocity allows for a lightweight portable unit. The controls for speed and thrust load control are specific to the machine tool mounted to the rail. The use of a preloaded spring assembly or a precharged air or hydraulic cylinder provides weld force/thrust load in the portable system and a pin/ball release holds the thrust load on the spring. A lightweight clamp attaches the system to the head of the rail and a locator placed under the ball of the rail ensures repeatable placement on the rail regardless of wear condition. Location for the stud is dictated by reference to the under-head radius region that transitions into the web of the rail. This configuration allows for reliable installation of studs with little operator influence on the process as all critical parameters are predetermined and mechanically controlled. As shown in FIG. 1, an exemplary embodiment of welding system 10 includes a length of rail 12 upon which restraining clamp 10 is mounted. Chuck 16 houses the stud (see FIGS. 2a-b) or another appurtenance, and flywheel 18 is connected to chuck 16. Front mount guide plate 20 supports bearing end plate 22, which is connected to bearing assemblies 24 which provide motor decouple and force engagement control. Rear mount guide plate supports bearing assemblies 24 and spring pack 28, which includes an air cylinder for providing thrust load. Motor coupler 32 is connected to drive shaft 34, which passes through back up plate 30 and connects with spring pack 28.

Figure 2A:
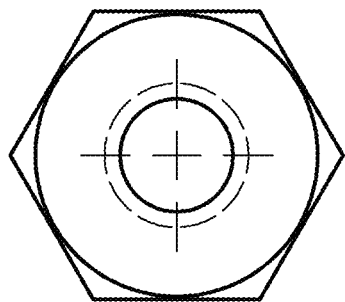
FIGS. 2a-b are front and side views respectively, of an exemplary stud or appurtenance suitable for mounting on the length of rail shown in FIG. 1.
Figure 2B:
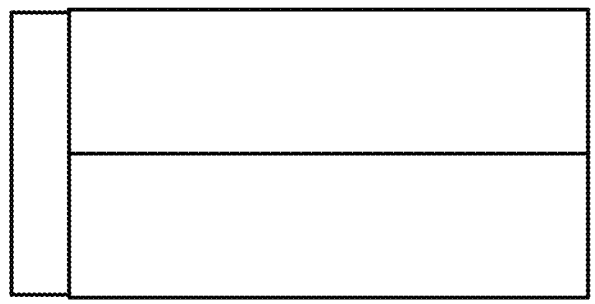

In accordance with this invention, welds may be produced using a portable inertia friction welding machine such as that disclosed in U.S. Pat. No. 6,779,709 (Stotler et al.), which is incorporated by reference herein, in its entirety, for all purposes. The device disclosed in U.S. Pat. No. 6,779,709 is referred to as the m120 inertia friction welder and is a stationary programmable inertia friction welding machine that is capable of varying thrust load from 2000 lbs. to 24,000 lbs.; varying rotating mass from 1.21 $WK^2$ to 19 $WK^2$, and varying initial spindle speed from 300 to 13,000 RPM. This device typically uses collet type clamps to hold parts and or tooling in the headstock and tailstock. Additionally, surface velocity, thrust load, and inertia may be varied to control heat input. Suitable alloys for the appurtenance (i.e., stud) include low-sulfur, low-lead alloys generally and C464 Naval Brass, C172 Class 4 copper, C260 Brass, Muntz Metal (National Bronze and Metals, Houston, Tex.; Southern Copper, Pelham, Ala.) and Ni-12P braze alloy, specifically. Studs such as that shown in FIGS. 2a-b, can be made from ½-in hex stock to allow for easy torsion energy delivery and to simplify production. Weld strengths approached 6000 pounds for the hex parts welded which is roughly 35 ksi tensile strength or 50% of the cold worked C464 brass. With a hex stud design, a speed of 4000-4500 RPM, an inertial mass of 1.21 $WK^2$, and a thrust load of 5200-lbs force to 6000-lbs force may be employed with work hardened Naval Brass. FIGS. 1-2 show metallographic and SEM analysis conducted on weld joints to verify that no martensite was formed due to the fact that the critical temperature in the steel was not exceeded during welding. Pretinned studs or appurtenances with an alloy to create a solid state braze joint such as 50/50 Pb—Sn solder, are also compatible with this invention. As will be appreciated by one of ordinary skill in the art, the process of friction welding is scalable based on variables such as the surface area and mean diameter of the appurtenance (i.e., second component).

Figure 3:
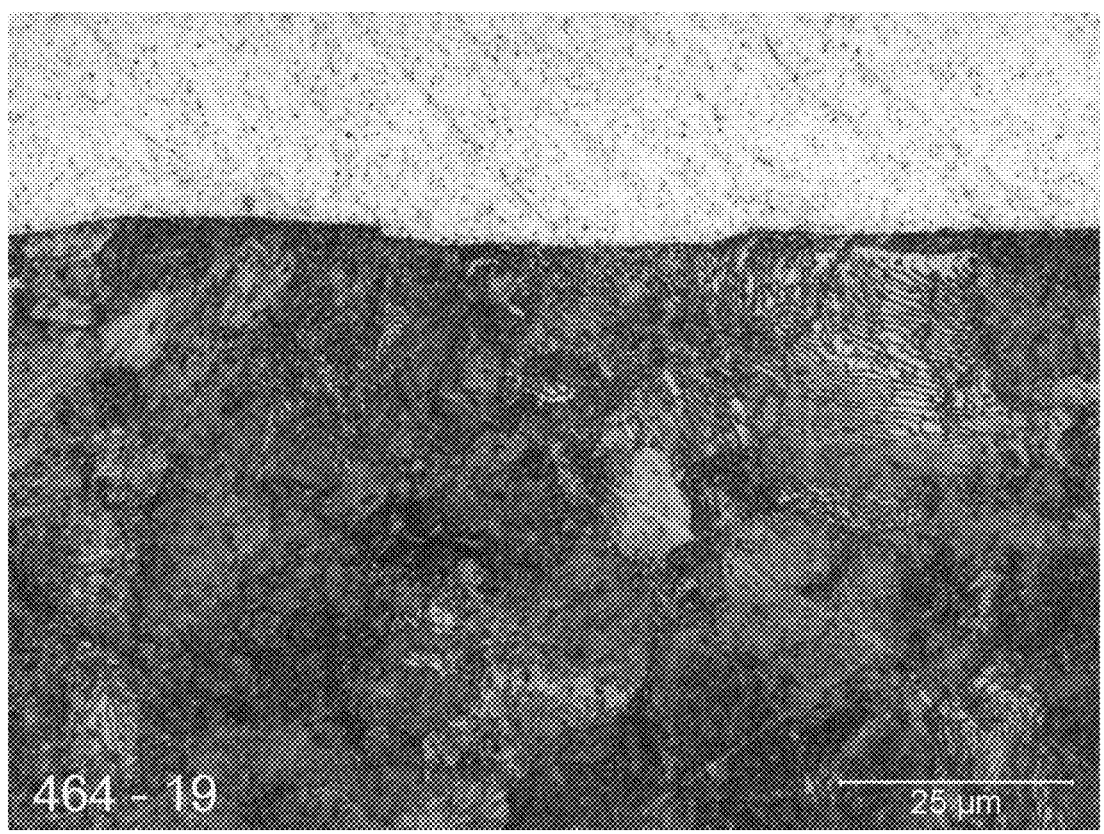
FIG. 3 provides a high-magnification metallurgical section of a weld joint created by the method of the present invention showing no apparent change to the underlying rail steel material.
Figure 4:
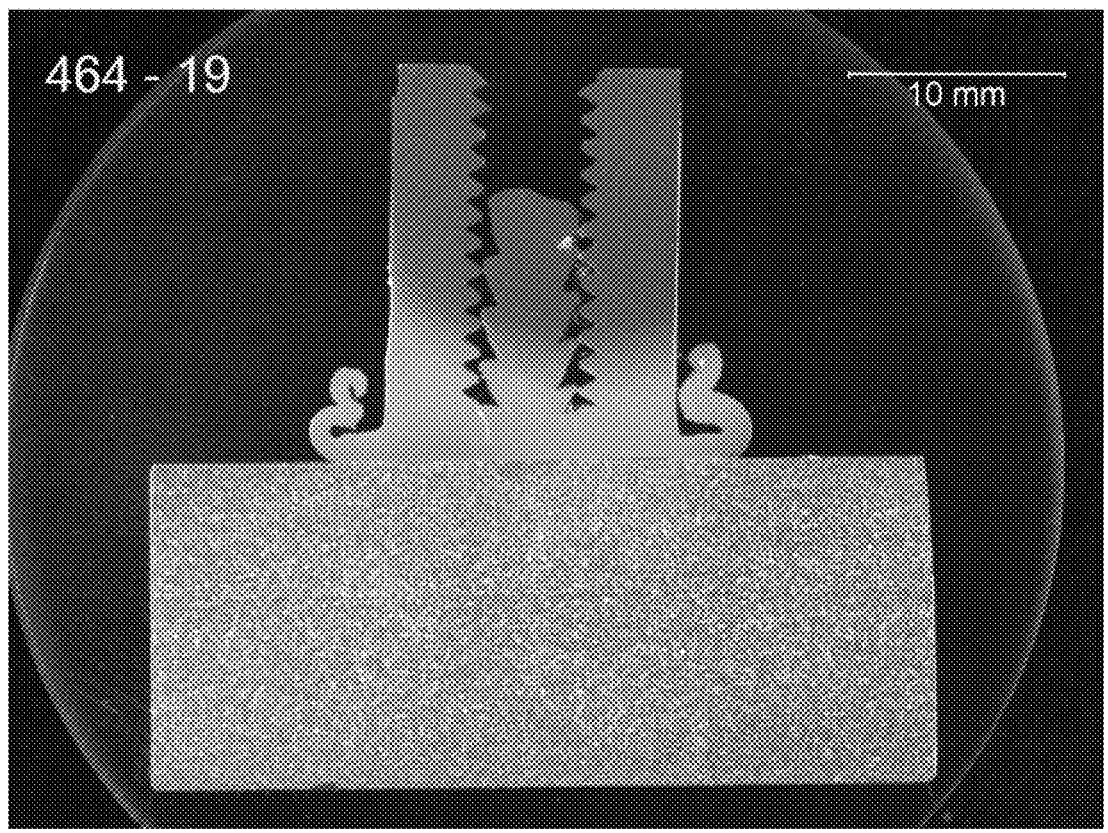
FIG. 4 provides a macro view of a weld stud mounted on rail material in accordance with the method of the present invention.

Advantageously, the present invention permits the installation of signal wires and studs on the head of the rail as no deleterious effects occur to the underlying rail material, i.e., brittleness and other weaknesses do no occur (see FIGS. 3-4). Currently, signal wires are located on the neutral axis of the rail making these connections susceptible to damage by maintenance equipment that snags and breaks studs and wiring located on the web neutral axis of the rail. Thus, the point of attachment may be moved from a low stress area to a critically loaded area (i.e., high stress area) without creating noticeable changes in the microstructure of the underlying alloy or problems with the integrity and strength of underlying substrate metal.

Certain aspects of this invention provide systems and methods for real-time quality validation of martensite-free attachment of studs (or other appurtenances) to rail sections. As previously indicated, the rail industry uses brazing methodologies for joining wires to rails sections for signaling and electrical conduction. While the present invention provides methods for using inertia friction welding to attach items to a rail surface, the quality and effectiveness of these methods can be dependent on operator skill and performance. Therefore, real-time quality control is important to users of the rail-wire interface created by the methods of this invention. While using inertia friction welding, certain predetermined inputs and outputs from the attachment process can be measured and the data gathered from such measurements can be analyzed using various processors incorporated into or associated with the relevant equipment and the process/method itself. The resulting analysis accurately predicts the quality of the weld based on measured process characteristics. In one embodiment, a displacement monitor is used during inertia friction welding of a stud to rail section for measuring total upset distance. In another embodiment, a tachometer is used during inertia friction welding of a stud to rail section to measure starting speed RPM's and real-time speed decay. In still another embodiment, one or more small electronic devices are placed on the portable inertia for validating weld quality. These devices measure, for example, initial RPM's speed; total upset distance; peak upset distance velocity; time of deceleration to zero RPM's; and use of a polynomial mathematic equation in the system processor to validate weld quality.

Certain aspects this invention provide various design modifications with regard to the specific attachment of a stud to a rail section using inertia friction welding. As previously indicated, current rail to wire interfaces involve the use of a braze, weld, or solder joint to attach a signal wire to a rail section. These approaches are used to overcome corrosion issues experienced when a clamped joint becomes loose, thereby allowing corrosion to enter the electrical conduction path. The use of a weld joint that incorporates a stud weld (using either a female or a male stud) prevents corrosion from occurring at any significant level between the rail and the attachment point of the stud. Selection of an appropriate stud material, such as Naval Brass, minimizes any potential risk of galvanic corrosion from occurring.

Solder or braze joints also require a signal wire be cut to remove the wire bundles for maintenance which shortens the wires and greatly limits reuse of the wire. The inertia friction welding method for attaching a stud to a rail section of this invention permits a corrosion resistant alloy to be welded onto the rail section, thereby eliminating corrosion concerns because the integrity of the inertia friction weld prevents the formation of crevices. The present invention provides design modifications that include threads to be included on the stud for facilitating multiple signal wire installation and de-installation cycles. This feature significantly simplifies removal of signaling and detection wires from the rail when maintenance of way (MOW) work is undertaken. This approach also reduces cost due to reduced materials utilization and eliminating the need to place additional welds on the rail every time a signal wire change is required. Further improvements to stud design include using the male stud to allow for a weld joint larger in diameter than the stud itself to be produced, thereby adding strength and mechanical advantages to the welded stud and increasing its resistance to breakage while in service.

Figure 5:
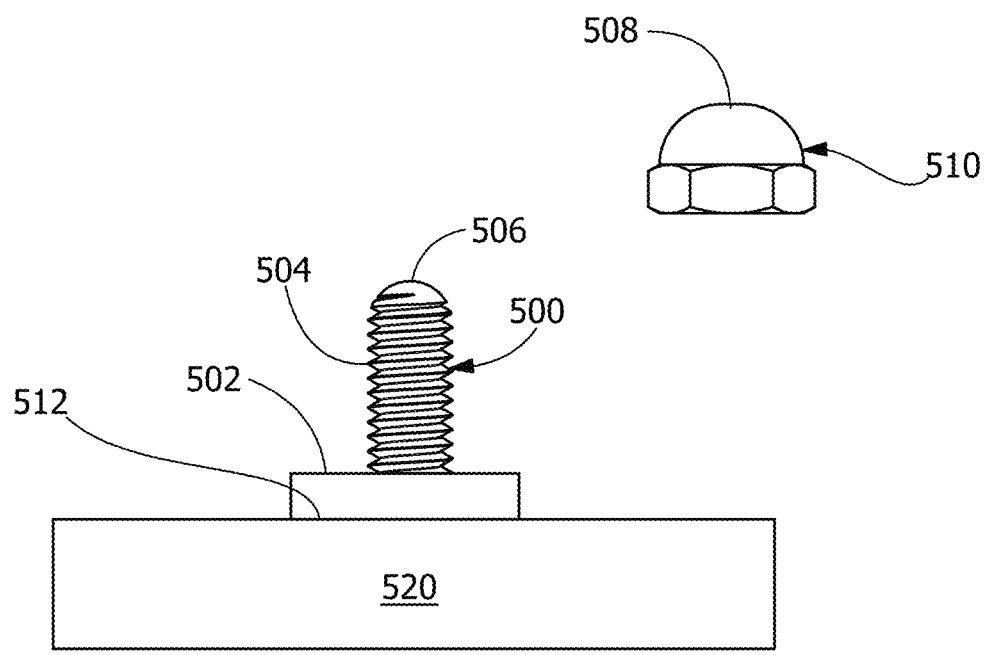
FIG. 5 is an illustration of exemplary alternate design modifications of the present invention concerning the attachment of a stud to a rail section using inertia friction welding.

With reference to the preceding paragraphs and FIG. 5, the various design modifications concerning the specific attachment of a stud to rail section using the inertia friction welding system described above, include: (i) utilizing ft threaded stud 500 welded to rail section 520 as the rail-wire interface attachment point without the creation of a crevice corrosion concern; (ii) using Naval Brass as the stud alloy for eliminating corrosion and galvanic concerns; (iii) leaving flat surface 502 on the stud with a diameter greater than threaded section 504 of stud 500 for electrical connection and application of thrust loading during the friction welding process; (iv) placing drive features on the outer diameter of the stud at its larger diameter area to allow for transfer of torque during the friction welding process; (v) minimizing stud length (e.g., less than 13 mm) to reduce the risk of wire and stud snags during MOW activity; (vi) placing ft rounded end 506 on the distal end of stud 500 to allow for centering in the inertial friction welding machine chuck and minimizing snag risk during MOW activities; (vii) placing rounded or radius feature 508 on nut 510, which is used to clamp wires onto stud 500 to reduce snags and loading during MOW activities; and (viii) making weld interface 512 between rail section 520 and stud 500 a hollow tubular design having a diameter greater than that of stud 500.

Figure 6:
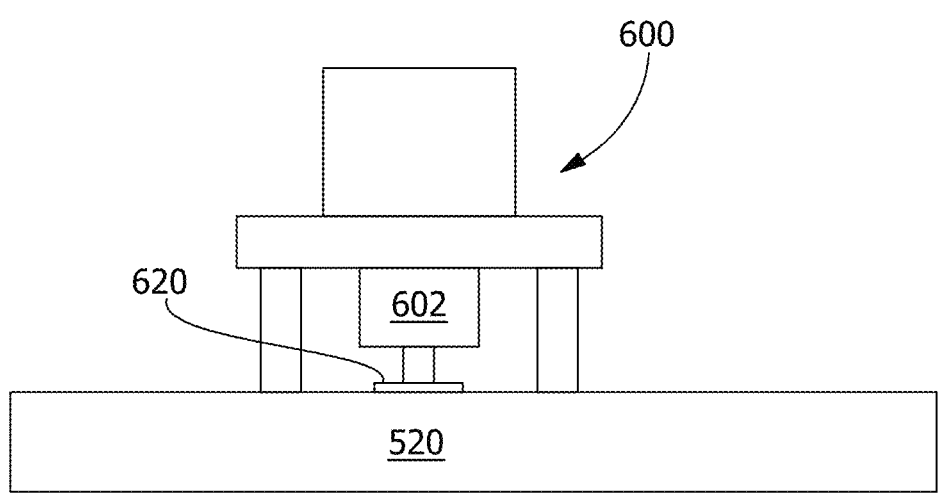
FIG. 6 provides an illustration of the inertia friction welder of the present invention modified to prepare the surface of a rail section prior to the welding of an appurtenance thereto.

With reference to FIG. 6, certain aspects this invention provide a surface preparation system and method for use with portable inertia friction welding system 600. Currently, the rail industry conducts upstream operations to properly prepare dissimilar weld joints for creating a weld between markedly different materials. As many of the relevant parts are portable and can be easily processed upstream, this processing is not typically difficult. However, when welding stud 500 to rail section 520 (see FIG. 5), the rail material is usually firmly attached to the ground and cannot be easily surfaced without extreme effort and extra tooling and processes. Accordingly, the approach disclosed herein uses already present inertia friction welding machine 600 to set the plane and axis of rotation when the welding machine is fixed to the rail section. Sander, grinder, or cutter 620 is then placed in chuck 602 of inertia friction welding machine 600 to create normality between the rail surface and the machine axis (see FIG. 6) as described in greater detail below.

Prior to making a martensite-free weld of stud 500 to rail section 520, the axis of stud 500 or attachment axis of rotation must be made perpendicular to the surface plane of rail section 520. Additionally, the rail surface must be cleaned and most irregularities should be removed to create surface conditions conducive to inertia friction welding. Creating axial alignment is based on the hardness difference between the rail steel and the stud alloy, which is much softer and weaker. Axial alignment allows stud 500 to accommodate all the upset. If this upset occurs in a non-aligned condition, then inertia friction welding machine 600 will not produce a full circumferential weld. This problem is typically solved by rotating the harder material in the dissimilar friction welding operation to set the plane with the hard material. Because this approach is not compatible with the welding method disclosed herein, this invention uses a hard abrasive or cutting device 620, inserted into the welder to reset the plane of the part to part interface. This simplifies set-up by creating a "perfect" plane with sanding disk or cutting tool 620 that is normal with the rotation axis. Research was conducted to establish the alignment requirements for the C464 Naval Brass stud to rail steel inertia friction welding joint. The results indicated that the desired axial alignment was within 0.5 degrees. A tool was built to be held in the welding machine and set a plane during welder rotation. This was tested by making welds on the surface and testing their strength. The strength was consistent and no gaps were found circumferentially in the weld.

The rail surface preparation methods contemplated by the present invention include: (i) using removable tool 620 placed in chuck 602 of inertia friction welding machine 600 to face the weld surface to create a plane that is normal to the axis of rotation in inertia friction welding machine 600; (ii) fixing the axial alignment of the friction weld joint with the inertia friction welding machine 600 to allow rotation of the softer material rather than the harder material; (iii) eliminating the need for special upstream processing of the surfaces prior to friction welding; (iv) the use of inertia friction welding machine 600 to prepare the surface for welding; and (v) allowing a different set of force and speed parameters to be used for sanding or surface preparation versus the welding operation itself.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A method for joining materials, comprising:
   (a) providing a first component, wherein the first component includes a first alloy having a known austenization temperature below which martensite forms when the component is heated and then cooled at a predetermined rate of cooling;
   (b) providing a second component, wherein the second component includes a second alloy, wherein the second component is a hex stud that further includes C464 brass, and wherein the second component includes an axis of rotation;
   (c) providing an inertia friction welding machine to create a weld between the first and second components without crossing the austenization temperature of the first alloy and forming martensite therein, wherein the inertia friction welding machine operates at a speed of 4000-4500 rpms, an inertial mass of 1.21 $WK^2$, and a thrust load of about 5200-lbs force to 6000-lbs force, and wherein the weld is formed at a predetermined location on the first component; and
   (d) creating axial alignment between the first component and the second component at the predetermined location by modifying the inertia friction welding machine to include a removable tool, wherein the removable tool creates a surface plane on the first component at the predetermined location that is normal to the axis of rotation of the second component.

2. The method of claim 1, wherein the first component is a length of train rail.

3. The method of claim 1, wherein the second component further includes an appurtenance, wherein the appurtenance provides a surface to which a signal wire or other device may be attached, and wherein the appurtenance is a stud, bolt, or block.

4. The method of claim 1, wherein the second component further includes C464 Naval Brass, C172 Class 4 copper, C260 Brass, Muntz Metal, Ni-12P braze alloy, or combinations thereof.

5. The method of claim 1, further comprising validating the characteristics of the weld created between the first and second components in real-time during the welding process.

6. The method of claim 3, further comprising physically modifying the appurtenance to enhance the welding characteristics and durability thereof.

* * * * *